US012063494B2

(12) United States Patent
Russell et al.

(10) Patent No.: US 12,063,494 B2
(45) Date of Patent: Aug. 13, 2024

(54) DUAL FUNCTION TRANSDUCER

(71) Applicant: Apple Inc., Cupertino, CA (US)

(72) Inventors: Rebecca J. Russell, San Jose, CA (US); Onur I. Ilkorur, Campbell, CA (US); David S. Wilkes, Jr., San Jose, CA (US); Christopher Wilk, Los Gatos, CA (US); Michael J. Newman, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/468,489

(22) Filed: Sep. 15, 2023

(65) Prior Publication Data

US 2024/0007796 A1 Jan. 4, 2024

Related U.S. Application Data

(62) Division of application No. 16/586,218, filed on Sep. 27, 2019, now Pat. No. 11,785,392.

(51) Int. Cl.

*H04R 9/06* (2006.01)
*H04R 9/02* (2006.01)
*H04R 9/04* (2006.01)

(52) U.S. Cl.

CPC ............. *H04R 9/046* (2013.01); *H04R 9/025* (2013.01); *H04R 9/06* (2013.01); *H04R 9/063* (2013.01);

(Continued)

(58) Field of Classification Search

CPC .......... H04R 9/025; H04R 9/046; H04R 9/06; H04R 9/063; H04R 2209/024;

(Continued)

(56) References Cited

U.S. PATENT DOCUMENTS 3,873,784 A * 3/1975 Doschek ................ H04R 9/047 381/186
6,376,967 B2 4/2002 Saarma et al.

(Continued)

FOREIGN PATENT DOCUMENTS

CA 1240326 A 1/2000
CN 1298622 6/2001

(Continued)

OTHER PUBLICATIONS

Office Action and Search Report for Chinese Application No. 202010858968.3 mailed Nov. 2, 2021, 13 pages.

*Primary Examiner* — Huyen D Le
(74) *Attorney, Agent, or Firm* — Aikin & Gallant, LLP

(57) ABSTRACT

A transducer assembly comprising: a magnet motor assembly comprising a first magnet plate and a second magnet plate arranged along an axis, a first support plate positioned between inward facing surfaces of the first magnet plate and the second magnet plate, a second support plate positioned along an outward facing surface of the first magnet plate to form a first magnetic gap between the first support plate and the second support plate, and a third support plate positioned along an outward facing surface of the second magnet plate to form a second magnetic gap between the first support plate and the third support plate; a voice coil coupled to the magnet motor assembly, wherein the voice coil is positioned around the first support plate and within the first magnetic gap and the second magnetic gap; and a piston coupled to the voice coil, wherein the piston is operable to vibrate in a direction parallel to the axis.

14 Claims, 13 Drawing Sheets

(52) U.S. Cl.
CPC .. *H04R 2209/024* (2013.01); *H04R 2209/026* (2013.01); *H04R 2209/041* (2013.01); *H04R 2400/03* (2013.01); *H04R 2499/11* (2013.01)

(58) Field of Classification Search
CPC ........ H04R 2209/026; H04R 2209/041; H04R 2400/03; H04R 2499/11
See application file for complete search history.

(56) References Cited

U.S. PATENT DOCUMENTS

| | | | | |
|---|---|---|---|---|
| 6,671,385 | B2 | 12/2003 | Suzuki et al. | |
| 6,809,635 | B1 | 10/2004 | Kaaresoja | |
| 6,931,140 | B2 | 8/2005 | Van Halteren et al. | |
| 7,062,063 | B2 | 6/2006 | Hansen et al. | |
| 7,099,489 | B2 | 8/2006 | Pan et al. | |
| 8,422,727 | B2 | 4/2013 | Takewa | |
| 8,781,150 | B2 | 7/2014 | Babb | |
| 9,148,716 | B2 | 9/2015 | Liu et al. | |
| 9,154,884 | B2 | 10/2015 | Yan | |
| 10,609,488 | B1 | 3/2020 | Concessi | |
| 10,631,096 | B1 * | 4/2020 | Garcia Selva | H04R 9/06 |
| 11,070,920 | B2 * | 7/2021 | Mikolajczyk | H02K 33/02 |
| 11,785,392 | B2 | 10/2023 | Mikolajczyk et al. | |
| 2003/0048920 | A1 | 3/2003 | Van Halteren et al. | |
| 2004/0131223 | A1 | 7/2004 | Stiles | |
| 2006/0126885 | A1 | 6/2006 | Combest | |
| 2007/0098209 | A1 * | 5/2007 | Setiabudi | H04R 9/063 381/420 |
| 2007/0206830 | A1 | 9/2007 | Usuki et al. | |
| 2013/0058519 | A1 | 3/2013 | Wilk | |
| 2015/0296302 | A1 | 10/2015 | Pircaro | |
| 2016/0071381 | A1 | 3/2016 | Kawamoto | |
| 2016/0234588 | A1 | 8/2016 | Timothy et al. | |
| 2016/0381462 | A1 | 12/2016 | Wang et al. | |
| 2017/0150273 | A1 | 5/2017 | Afshar | |
| 2018/0234771 | A1 | 8/2018 | Hsieh et al. | |

FOREIGN PATENT DOCUMENTS

| | | |
|---|---|---|
| CN | 1838836 | 9/2006 |
| CN | 106576207 | 4/2017 |
| CN | 107404683 | 11/2017 |
| CN | 108271105 | 7/2018 |
| CN | 108605176 | 9/2018 |

* cited by examiner

DUAL FUNCTION TRANSDUCER

RELATED APPLICATIONS

This application is a divisional of co-pending U.S. patent application Ser. No. 16/586,218, filed Sep. 27, 2019 which is herein incorporated by reference.

FIELD

An aspect of the invention is directed to a dual function transducer, more specifically, a dual function transducer that contains a single magnet motor assembly for loudspeaker and shaker functionality. Other aspects are also described and claimed.

BACKGROUND

In modern consumer electronics, audio capability is playing an increasingly larger role as improvements in digital audio signal processing and audio content delivery continue to happen. In this aspect, there is a wide range of consumer electronics devices that can benefit from improved audio performance. For instance, smart phones include, for example, electro-acoustic transducers such as speakers that can benefit from improved audio performance. Smart phones, however, do not have sufficient space to house multiple transducers and/or actuators typically used to achieve various functions that may be desirable (e.g., acoustic output, haptic output, etc.). This is also true for some portable personal computers such as laptop, notebook, and tablet computers, and, to a lesser extent, desktop personal computers with built-in transducers.

SUMMARY

An aspect of the disclosure is directed to a dual function transducer that can be used as both an electroacoustic transducer (e.g., loudspeaker) and a tactile transducer (e.g., shaker). The loudspeaker functionality may be used to output sound from the device while the shaker may be used to produce a haptic output, for example by vibrating a surface it is connected to. The transducer may include a single magnet motor assembly that accommodates both the loudspeaker components (e.g., piston and voice coil) and shaker components (e.g., shaker coil) so that both functions can be achieved using a single transducer. Representatively, the single magnet motor assembly may be used to generate one or more magnetic field(s) that are used by subcomponents of the dual function transducer to generate the desired output. For example, one of the subcomponents may provide the shaking (e.g., vibration) function and another of the subcomponent may serve a loudspeaker function. Both functions may require the electromechanical actuation of a portion of the components. The actuation may be in a same platen for both functions in the dual function transducer. The magnetic system design may therefore enable the utilization of two functions by directing the magnetic field into two or more sets of high magnetic field density. One or more sets will be utilized by the vibration function, and the other set by the loudspeaker function.

Representatively, in one aspect, the vibration function may use a static coil that is placed in one of the sets of high magnetic field density so that it can generate an electromagnetic force when an electrical current is applied to the coil. The magnetic system may be assembled to a compliant suspension system. When the force is generated by the coil, the magnetic system may move (actuate) to transmit a physical motion/force outside the system. The loudspeaker function may have a coil that is attached to a lightweight piston (e.g., diaphragm) that is connected to a suspension system. This is assembled such that the coil is suspended in the other set of high magnetic field density area from the magnetic system. In the loudspeaker application, the magnetic system has essentially no movement but the electromagnetic force generated moves the coil/piston assembly. This provides the mechanism to generate audible frequencies, for example, from 100 Hz to 20 kHz. The vibration function may require relatively low frequencies which are generally inaudible, whereas the loudspeaker function uses a portion of the audible frequency band. The different coils for the vibration and loudspeaker functions may have the ability to be driven independently by different channels on an amplifier, or together by the same channel, depending on the application needs. The dual function transducer provides the additional advantage of enabling sufficient space (volume) savings in the system, and can be made much more compact two separate modules used to achieve vibration and loudspeaker functions.

More specifically, aspects of the disclosure include a transducer assembly having a magnet motor assembly, and a piston and voice coil coupled to the magnet motor assembly. The magnet motor assembly may include a first magnet plate and a second magnet plate arranged along an axis, a first support plate positioned between inward facing surfaces of the first magnet plate and the second magnet plate, a second support plate positioned along an outward facing surface of the first magnet plate to form a first magnetic gap between the first support plate and the second support plate and a third support plate positioned along an outward facing surface of the second magnet plate to form a second magnetic gap between the first support plate and the third support plate. The voice coil may be positioned around the first support plate and within the magnetic gap, and the piston vibrates in a direction parallel to the axis. In some aspects, the first support plate and the second support plate extend beyond ends of the first magnet plate and the second magnet plate such that the magnetic gap is formed by surfaces of the first support plate and the second support plate and the ends of the first magnet plate and the second magnet plate. The inward facing surfaces of the first magnet plate and the second magnet plate may have a same magnetic pole, and a magnetic flux line across the magnetic gap may be perpendicular to a winding height of the voice coil. In some aspects, a length or a width of the first magnet plate and the second magnet plate may be parallel to the axis. The magnet motor assembly may be a first magnet motor assembly, the piston is a first piston and the voice coil is a first voice coil, and the assembly may further include a second magnet motor assembly that shares a third support plate positioned along an outward facing surface of the second magnet plate with the first magnet motor assembly. The second magnet motor assembly may include a third magnet plate, a fourth magnet plate and a fourth support plate, the third magnet plate is positioned between the third support plate and the fourth support plate, and the fourth magnet plate is positioned along a side of the fourth support plate opposite the third magnet plate; and a second piston and a second voice coil arranged along an end of the third magnet plate and the fourth magnet plate. In some aspects, the axis is a first axis, and the second piston vibrates along a second axis that is at an angle to the first axis. The piston and the voice coil may include a first piston and a first voice coil, and the transducer assembly may further include a second piston and a second voice coil positioned at an end of the first magnet plate and the second magnet plate, and the second piston vibrates along the axis.

In another aspect, a dual function transducer assembly is provided including a magnet motor assembly comprising a first magnet plate and a second magnet plate arranged in parallel to one another along a first axis; a sound output assembly coupled to the magnet motor assembly, the sound output assembly comprising a piston and a voice coil, and wherein the piston vibrates in a direction parallel to the first axis; and a shaker assembly coupled to the magnet motor assembly, the shaker assembly comprising a first shaker coil and a second shaker coil arranged to cause a vibration of the magnet assembly in a direction parallel to a second axis that is perpendicular to the first axis. In some aspects, the magnet motor assembly is movably coupled to a transducer frame by a leaf spring. Still further, the voice coil may be rotated ninety degrees relative to the first shaker coil and the second shaker coil. In some aspects, inward facing surfaces of the first magnet plate and the second magnet plate are attached to a center plate, and a pair of outer plates are attached to outward facing surfaces of the first magnet plate and the second magnet plate. The center plate and the pair of outer plates may form at least three different magnetic gaps around the first magnet plate and the second magnet plate for receiving the voice coil, the first shaker coil and the second shaker coil. In some aspects, the piston and the voice coil are a first piston and first voice coil, and the sound output assembly further includes a second piston and a second voice coil arranged along another end of the magnet motor assembly and operable to vibrate in a direction parallel to the first axis.

In another aspect, a dual function transducer assembly includes a magnet motor assembly; a first transducer component coupled to the magnet motor assembly, the first transducer component operable to move in a direction parallel to a first axis to produce a first transducer function; and a second transducer component coupled to the magnet motor assembly, the second transducer component operable to move in a direction parallel to a second axis to produce a second transducer function, the second axis is perpendicular to the first axis, and the first axis and the second axis are within a same plane. In some aspects, the first transducer function is a sound output. The first transducer component may be a voice coil coupled to a piston, and actuation of the voice coil vibrates the piston in the direction parallel to the first axis. The voice coil may be positioned within a voice coil gap formed at a length side of the magnet assembly. In still further aspects, the second transducer function is a haptic output. The second transducer component may include a shaker coil, and actuation of the shaker coil vibrates the magnet assembly in a direction parallel to the second axis. The shaker coil may be positioned within a shaker coil gap formed at a width side of the magnet assembly. The shaker coil may be a first shaker coil, and the system further comprises a second shaker coil. The magnet assembly may be configured to direct a magnetic field into a first region of high magnetic field density and a second region of high magnetic field density, and the first region of high magnetic field density actuates the first transducer component and the second region of high magnetic field density actuates the second transducer component. In some aspects, the first region of high magnetic field density is along a length side of the magnet assembly and the second region of high magnetic field density is along a width side of the magnet assembly. The first transducer component and the second transducer component may be driven independently upon application of a current. In some aspects, the first transducer component and the second transducer component may be driven together upon application of a current.

In still further aspects, a transducer assembly is provided including a magnet motor assembly comprising a first magnet plate, a second magnet plate, a center plate positioned along inward facing surfaces of the first magnet plate and the second magnet plate, and a pair of outer plates positioned along outward facing surfaces of the first magnet plate and the second magnet plate to form a plurality of channels along ends of the center plate that extend beyond the first and second magnet plates; and a coil positioned around at least one of the ends of the center plate and within at least one of the plurality of channels. In some aspects, the coil is one of a first pair of coils and the assembly further comprises a second pair of coils, the first pair of coils are positioned along a first axis and the second pair of coils are positioned along a second axis perpendicular to the first axis. In other aspects, the coil is a shaker coil, and the shaker coil is operable to move the magnet motor assembly in at least two different directions. The shaker coil may be fixed to a device to be actuated and the magnet motor assembly is mounted to a compliant base. In other aspects, the coil is a first voice coil, and the transducer assembly further comprises a second voice coil, a first diaphragm coupled to the first voice coil and a second diaphragm coupled to the second voice coil. In some cases, the first voice coil and the second voice coil are operable to vibrate in directions parallel to at least two different axes. The magnet motor assembly may include an open center. In some aspects, at least one of the first voice coil and the first diaphragm or the second voice coil and the second diaphragm are positioned within the open center and the first diaphragm. An extension member may extend from opposing surfaces of the center plate and through a center opening in the first magnet plate, the second magnet plate and the pair of outer plates. In some aspects, at least one of the plurality of channels is formed between at least one end of the extension member and at least one of the pair of outer plates, and wherein the at least one of the plurality of channels receives a third voice coil arranged along a third axis different than at least two axes along which the first and second voice coils are arranged. In still further aspects, a third diaphragm is coupled to the third voice coil and is operable to vibrate in a direction parallel to the third axis.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to “an” or “one” aspect in this disclosure are not necessarily to the same aspect, and they mean at least one.

DETAILED DESCRIPTION

In this section we shall explain several preferred aspects of this invention with reference to the appended drawings. Whenever the shapes, relative positions and other aspects of the parts described in the aspects are not clearly defined, the scope of the invention is not limited only to the parts shown, which are meant merely for the purpose of illustration. Also, while numerous details are set forth, it is understood that some aspects of the invention may be practiced without these details. In other instances, well-known structures and techniques have not been shown in detail so as not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
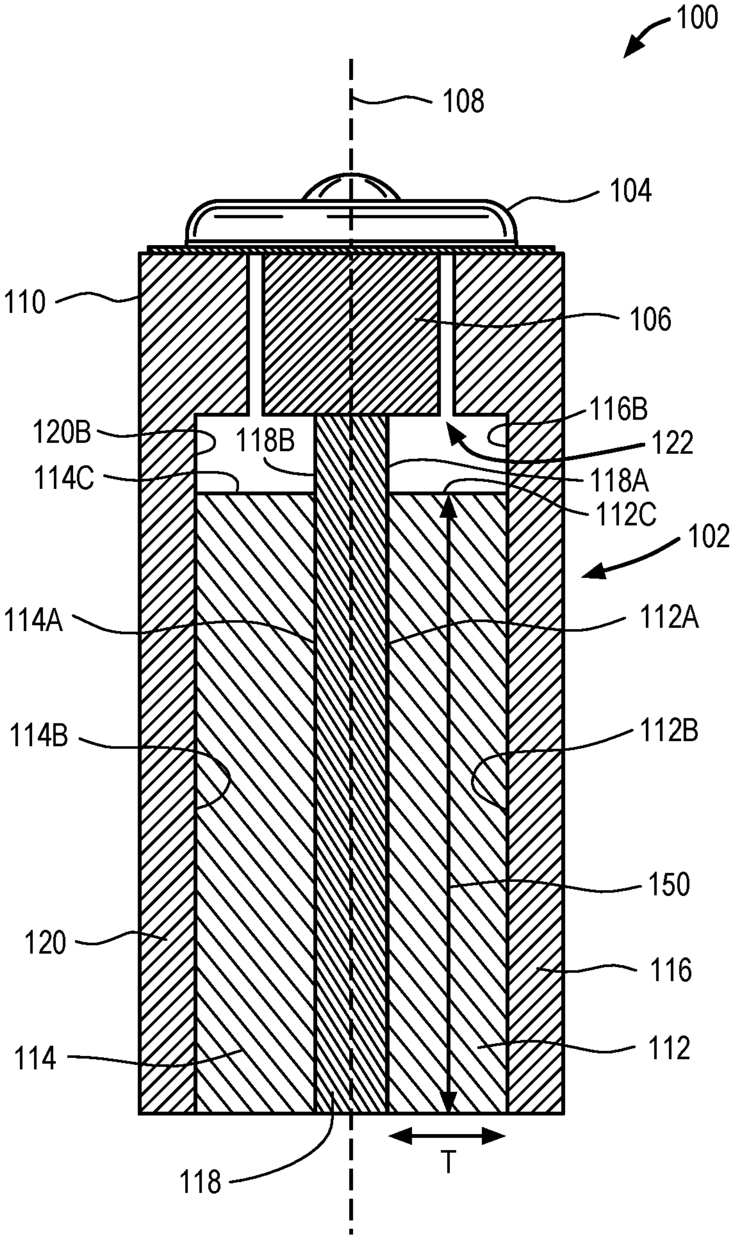
FIG. 1 illustrates a cross-sectional end view of one aspect of a transducer assembly.
Figure 2:
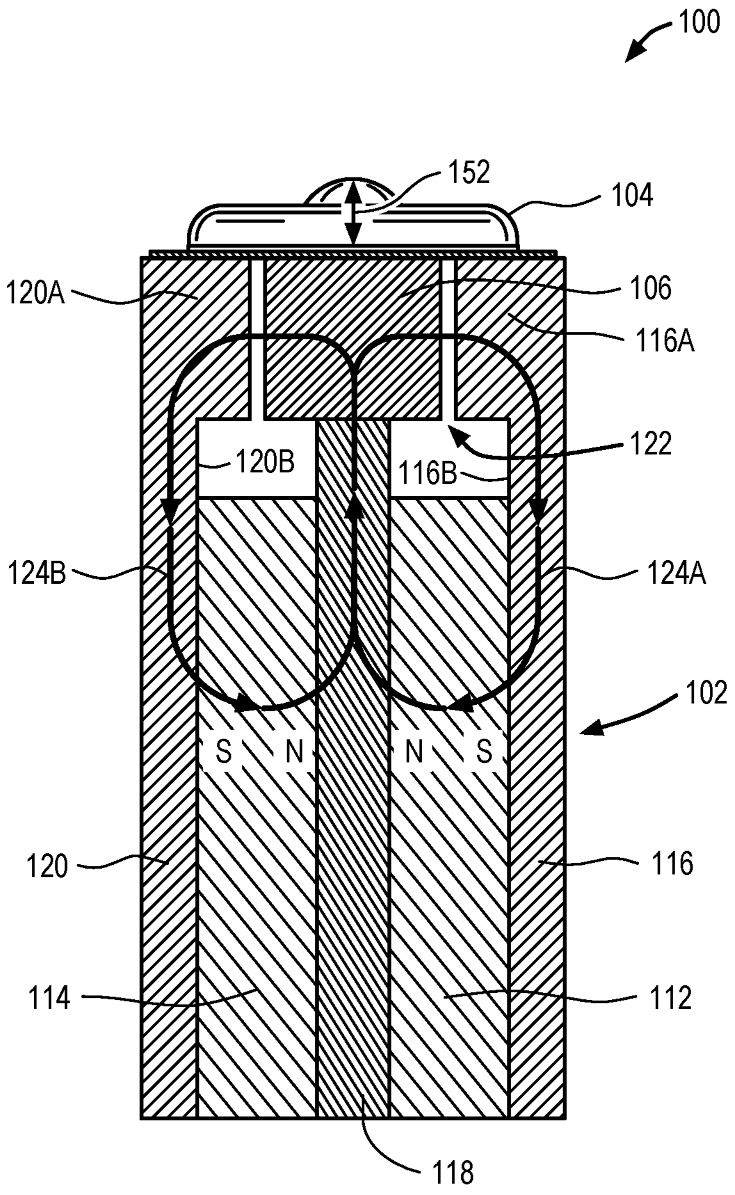
FIG. 2 illustrates a cross-sectional side view of one aspect of the transducer assembly of FIG. 1.

FIG. 1-FIG. 2 illustrate cross-sectional end views of a transducer assembly. Transducer assembly 100 may be, for example, an electrodynamic or electro-acoustic transducer that converts electrical signals into vibrations and/or audible signals that can be output from a device within which transducer assembly 100 is integrated. For example, transducer assembly 100 may be a loudspeaker and/or shaker integrated within a smart phone, or other similar compact electronic device. In some cases, transducer assembly 100 may be attached to a surface of the device to actuate (e.g., vibrate) the surface. Transducer assembly 100 may be enclosed within a housing or enclosure of the device within which it is integrated.

Transducer 100 may generally include a magnet motor assembly 102, a piston 104 and a voice coil 106. In some aspects, the magnet motor assembly 102 may be arranged along a different axis than the piston 104 and voice coil 106. Representatively, magnet motor assembly 102 may be arranged along a first axis 108, and piston 104 and voice coil 106 may be arranged along an end 110 of the magnet motor assembly 102. Referring now in more detail to magnet motor assembly 102, magnet motor assembly 102 may include a first magnet 112 and a second magnet 114 arranged along first axis 108. For example, first magnet 112 and second magnet 114 may be magnet plates that have a rectangular shape. The rectangular shaped magnets 112, 114 may be arranged so that a length dimension (L) or a width dimension (W), illustrated by line 150, of the rectangular shaped magnets 112, 114 runs in a direction parallel to first axis 108, as shown in FIG. 1. The thickness dimension (T) may run perpendicular to the first axis 108. In this aspect, the inward surface 112A of magnet 112 faces the inward surface 114A of magnet 114. Since surfaces 112A and 114A face one another, they may also be referred to herein as interfacing surfaces of the magnets plates 112, 114, respectively. The magnets 112, 114 may be positioned between support plates 116, 118 and 120. Representatively, the inward surfaces 112A, 114A of magnets 112, 114 may be positioned along opposite sides or surfaces of inner support plate 118. The outward facing surfaces of 112B, 114B of magnets 112, 114 may be positioned along inward facing surfaces of support plates 116, 120. In some aspects, the surfaces of magnets 112, 114 and support plates 116, 118 and 120 will directly contact one another and/or may be mechanically or chemically attached to one another to complete the magnet assembly structure. For example, the inward surfaces 112A, 114A of magnets 112, 114 may directly contact the opposing sides or surfaces of support plate 118, and the outward surfaces 112B, 114B may directly contact the inward facing sides or surfaces of support plates 116, 120, respectively.

Support plates 116, 118, 120 may be made of a material suitable for guiding a magnetic flux through the magnet assembly to create regions of high magnetic field density for actuating the transducer functions. For example, support plates 116, 118, 120 may be steel plates that are in direct contact with the magnets 112, 114 positioned in between. Support plates 116, 118 and 120 may have a similar shape to magnets 112, 114, except that they may be taller than (e.g., longer length or width dimension), or otherwise extend beyond, an end of magnets 112, 114 so that the air or magnetic gap 122 that the voice coil 106 resides in is formed at the ends of magnets 112, 114. For example, support plates 116, 118, 120 may have ends that extend beyond magnets 112, 114 such that the air or magnetic gap 122 is a channel defined by the interfacing sides or surfaces 116B, 118A, 118B, 120B of plates 116, 118, 120 extending beyond magnets 112, 114, and the ends 112C, 114C of magnets 112, 114. In addition, the same poles of each of magnets 112, 114 may face each other. For example, each of surfaces 112A, 114A of magnets 112, 114, respectively, may represent a North pole so the same poles face, or interface with, one another. This arrangement directs the magnetic field generated by the magnets 112, 114 and associated magnetic flux density field lines 124A, 124B through the air or magnetic gap 122, and creates one or more regions of high magnetic field density (e.g., region containing lines 124A, 124B), as shown in FIG. 2.

The voice coil 106 may be attached to a bottom side of piston 104, and positioned around the end of the middle plate 118 and within air or magnetic gap 122. The piston 104, which may include a diaphragm and a surround, may be attached to a fixed portion of the assembly. The surround may be a relatively compliant structure that will allow the voice coil 106 to move relative to the middle plate 118. For example, the magnetic flux density field lines 124A, 124B pass through the voice coil 106 positioned in gap 122 in a direction perpendicular to the winding height of voice coil 106 to drive a movement (e.g., vibration) of voice coil 106 in a direction parallel to first axis 108. The magnetic field may be perpendicular to the current flowing through voice coil 106 so that the resulting force output is in a direction parallel to the first axis 108. This in turn, drives a movement of the piston 104 (which is attached to the voice coil 106) in a direction parallel to first axis 108. It should be recognized that having the magnetic flux density field lines 124A, 124B perpendicular to the winding height of the voice coil 106 allows for a narrow dimension (e.g., winding width) of the voice coil 106 to be arranged in a relatively narrow air or magnetic gap, which in turn results in a more efficient magnet motor assembly. For example, in some aspects, the portion of the air or magnetic gap 122 that voice coil 106 is positioned in may be narrower than the remainder of the gap. For example, the inward facing surfaces 116B, 120B of plates 116, 120 (e.g., surfaces that interface with the magnets) may include protrusions 116A, 120A, respectively. The protrusions 116A, 120A may be of any size and dimension suitable to narrow the size of the gap surrounding voice coil 106 as shown. During operation, a current (or signal) is driven through voice coil 106 to produce a magnetic field and a high magnetic field density within gap 122. The magnet assembly 102 may be relative stationary compared to the voice coil 106 such that the movement of the voice coil 106 in response to the magnetic field moves (e.g., vibrates) piston 104 in a direction 152 parallel to first axis 108. In some aspects, the movement of piston 104 is used to generate a sound output. In this aspect, transducer assembly 100 may be a loudspeaker, or otherwise have a loudspeaker function.

The piston 104 (e.g., diaphragm and surround) and voice coil 106 may have any size and dimension that allows for voice coil 106 to be suspended within the gap 122. Representatively, where the gap 122 is formed by elongated channels on each side of plate 118, piston 104 and voice coil 106 may also have an elongated shape. For example, piston 104 and voice coil 1056 may have a race track or rectangular shape and the longest sides may be arranged within, or otherwise along, the channels between plates 116, 118, 120 which form gap 122. In some aspects, piston 104 and voice coil 106 may be the only moving structures coupled to magnet assembly 102, and the other end of magnet assembly 102 may be mounted to an enclosure wall within which transducer 100 is implemented. In other aspects, a piston and voice coil may be positioned along both ends of magnet assembly 102, or along other sides of magnet assembly 102, so that the piston/voice coils vibrate along more than one axis of transducer 100.

Figure 3:
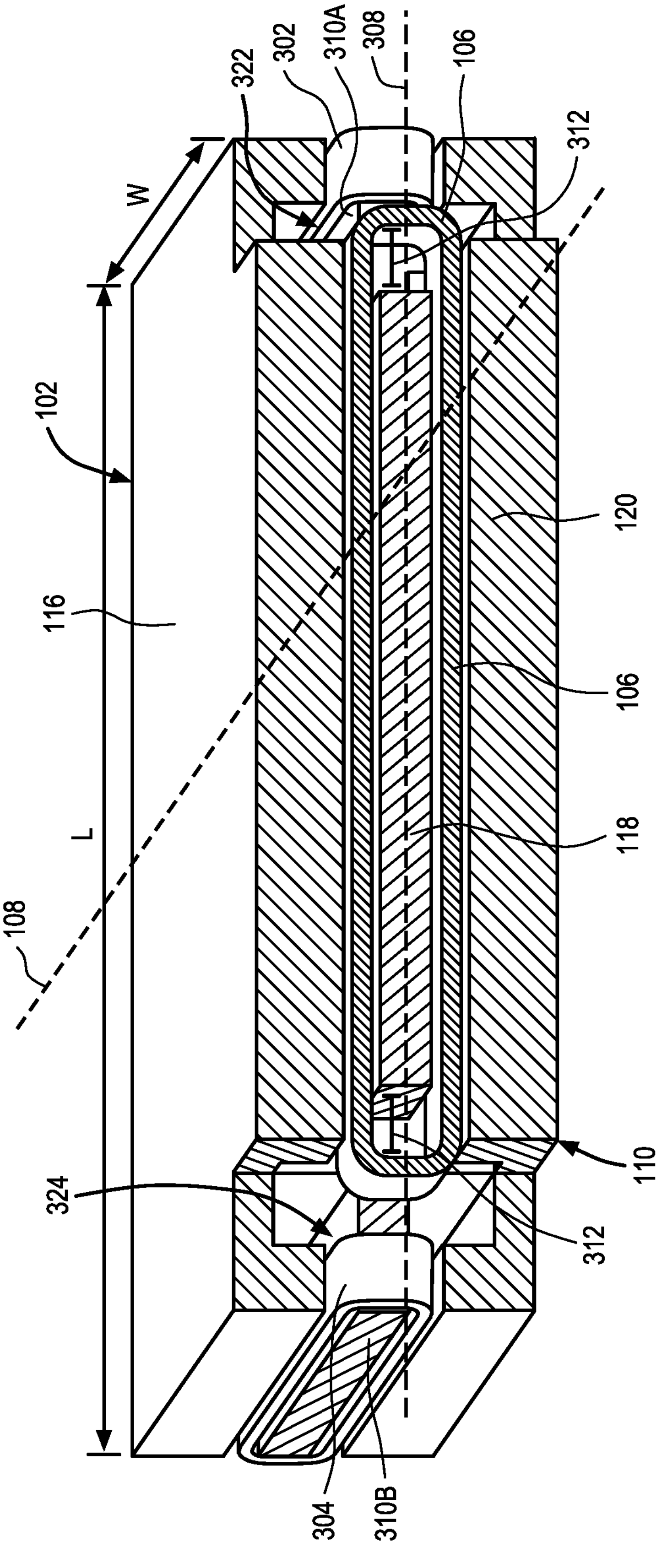
FIG. 3 illustrates a perspective view of one aspect of a transducer assembly.

FIG. 3 illustrates a perspective view of a transducer assembly. Transducer assembly 300 is similar to transducer assembly 100, except that it incorporates both a loudspeaker function (e.g., sound output) and a shaker function (e.g., surface actuation). The loudspeaker function may be accomplished by vibrating the piston in a direction parallel to the first axis previously discussed, while the shaker function is accomplished by moving the magnet assembly in a different direction, for example, a direction parallel to a second axis (e.g., an axis perpendicular to the first axis). Representatively, transducer assembly 300 may include the same transducer components discussed in reference to FIG. 1-FIG. 2 to accomplish the loudspeaker function. For example, transducer assembly 300 may include magnet assembly 102, voice coil 106 and piston (not shown for ease of illustration) as previously discussed in reference to FIG. 1-FIG. 2. As previously discussed, this particular magnet assembly 102 and voice coil 106 configuration can move or vibrate voice coil 106 in a direction parallel to the first axis 108 to achieve a loudspeaker function.

The shaker function of transducer 300 may be achieved by moving or vibrating the magnet assembly 102 in a direction parallel to a second axis 308 that is different than the first axis 108. For example, where magnet assembly 102 has a rectangular shape as shown, the first axis 108 may run in a direction parallel to a width side or dimension (W) and the second axis 308 may run in a direction parallel to a length side or dimension (L) of magnet assembly 102. In this aspect, transducer 300 may be considered a biaxial or multi-axial transducer because it moves in different directions along at least two or more axes. Transducer 300 may further include a pair of shaker coils 302, 304 positioned along opposite sides or ends 310A, 310B of magnet assembly 102. Shaker coils 302, 304 may be positioned along the width ends or sides of the middle support plate 118 as shown in FIG. 3. Air or magnetic gaps 322, 324 (similar to the air gap 122 of FIGS. 1-2) may be formed around the ends 310A, 310B of support plate 118 to accommodate the shaker coils 302, 304, respectively. The plates 116, 118, 120 may guide the flux density field lines (e.g., field lines 124A, 124B) through the magnetic gaps 322, 324 at the ends 310A, 310B in a manner similar to that previously discussed in reference to FIG. 2. This, in turn, causes the shaker coils 302, 304 positioned at ends 310A, 310B to generate a force parallel to the second axis 308. It should further be understood that although a pair of shaker coils 302, 304 alone each end of the magnet assembly are disclosed, it is contemplated that in some aspects, a single coil along only one side of the magnet assembly may be used to drive the shaker function. For example, it is contemplated that in another configuration, only one of shaker coils 302, 304 may be positioned at one of ends 310A, 310B of plate 118 of magnet assembly and the other coil may be omitted, and the one coil used to driver the shaker operation.

Figure 4:
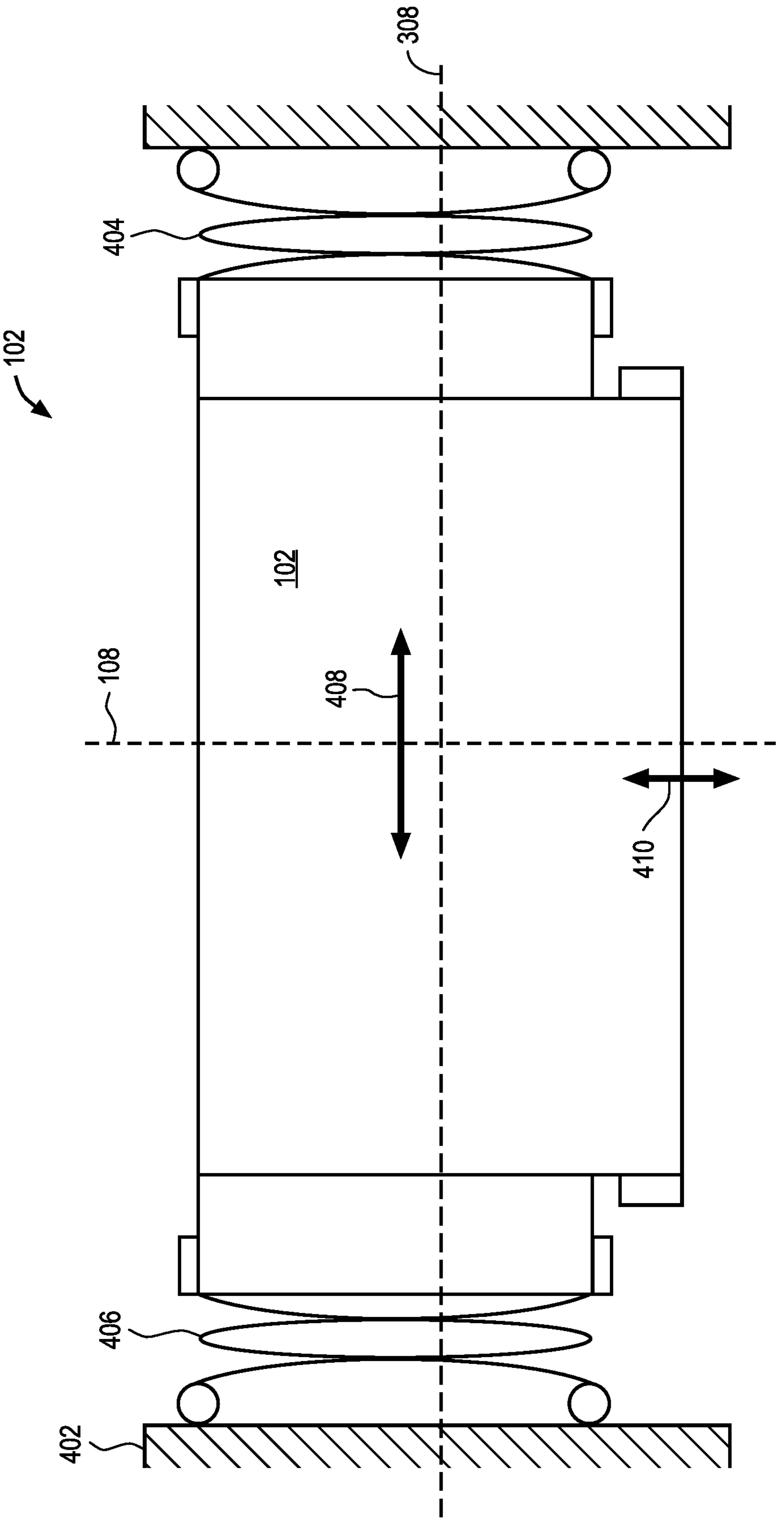
FIG. 4 illustrates a schematic diaphragm of a transducer assembly coupled to a frame.

The magnet assembly 102 may be mounted within a frame or other enclosure by a compliant suspension system so that the force generated by the shaker coils 302, 304 can move the magnet assembly 102 in a direction parallel to axis 308. For example, as illustrated in FIG. 4, magnet assembly 102 may be mounted to a relatively stationary frame 402 by compliant members 404, 406. Compliant members 404, 406 may, for example, be leaf springs or another compliant structure that will allow magnet assembly 102 to move in a direction 408 parallel to axis 308. In some aspects, compliant members 404, 406 may be relatively stiff or non-compliant to movement in a direction 410 parallel to the first axis 108 (or perpendicular to axis 308). In this aspect, a movement of magnet assembly 102 along the first axis 108 in response to the force generated by voice coil 106 is prevented or minimized. Although not shown, it should further be understood that in some aspects, an actuating surface (e.g., wall of a device enclosure) or other surface desired to be moved may be attached to transducer 300 such that the shaker function of transducer 300 causes the actuating surface to move.

Returning now to FIG. 3, to accommodate the movement of magnet assembly 102 in the shaker direction (e.g., direction parallel to axis 308), there may be gaps 312 between inner surface of voice coil 106 and the middle plate 118. In particular, as previously discussed, voice coil 106 may be attached to a piston (e.g., diaphragm and suspension), which may be attached to a relatively stationary structure (e.g., frame 402). Since voice coil 106 is therefore not directly attached to the magnet assembly 102, it does not move in the shaker direction along with the magnet assembly 102. Rather, the movement of piston may be limited to a direction parallel to the axis 108. The end of middle plate 118 must therefore be able to move within voice coil 106 without hitting the inner surfaces at each end of the voice coil 106. The gaps 312 may therefore be of a sufficient size such that middle plate 118 can move in the shaker direction without contacting, or otherwise interfering with, the surrounding voice coil 106.

In this aspect, transducer 300 may be a dual function transducer in that it can generate both a physical motion/force (e.g., shaker function) and acoustic output (e.g., loudspeaker function). In addition, the dual functions can be achieved using a single magnet assembly 102 (e.g., a single motor) because the magnet assembly 102 directs the magnetic field into two (or more) sets or regions of high magnetic field density (e.g., gaps 122, 322 and 324) that can be used to drive components used to achieve the vibration (shaker) function and components to achieve the loudspeaker function. In addition, the actuation of the components may be in a same plane (e.g., a plane defined by the middle plate 118), although the component movement may be in different directions. For example, the magnet assembly 102 may cause the voice coil 106 positioned in gap 122 (and the associated piston) to move in directions parallel to first axis 108 to achieve the loudspeaker function, and shaker coils 302, 304 positioned in gaps 322, 324 to move in directions parallel to second axis 308 to achieve the shaker function. In addition, as previously discussed, the vibration function requires relatively low frequencies which are generally inaudible, whereas the loudspeaker function uses a portion of the audible frequency band. Thus, the voice coil and shaker coils have the ability to be driven independently by different channels on the amplifier (upon input of a current or signal), or together by the same channel depending on the application needs. This, in turn, may reduce the amplifier resources.

Figure 5:
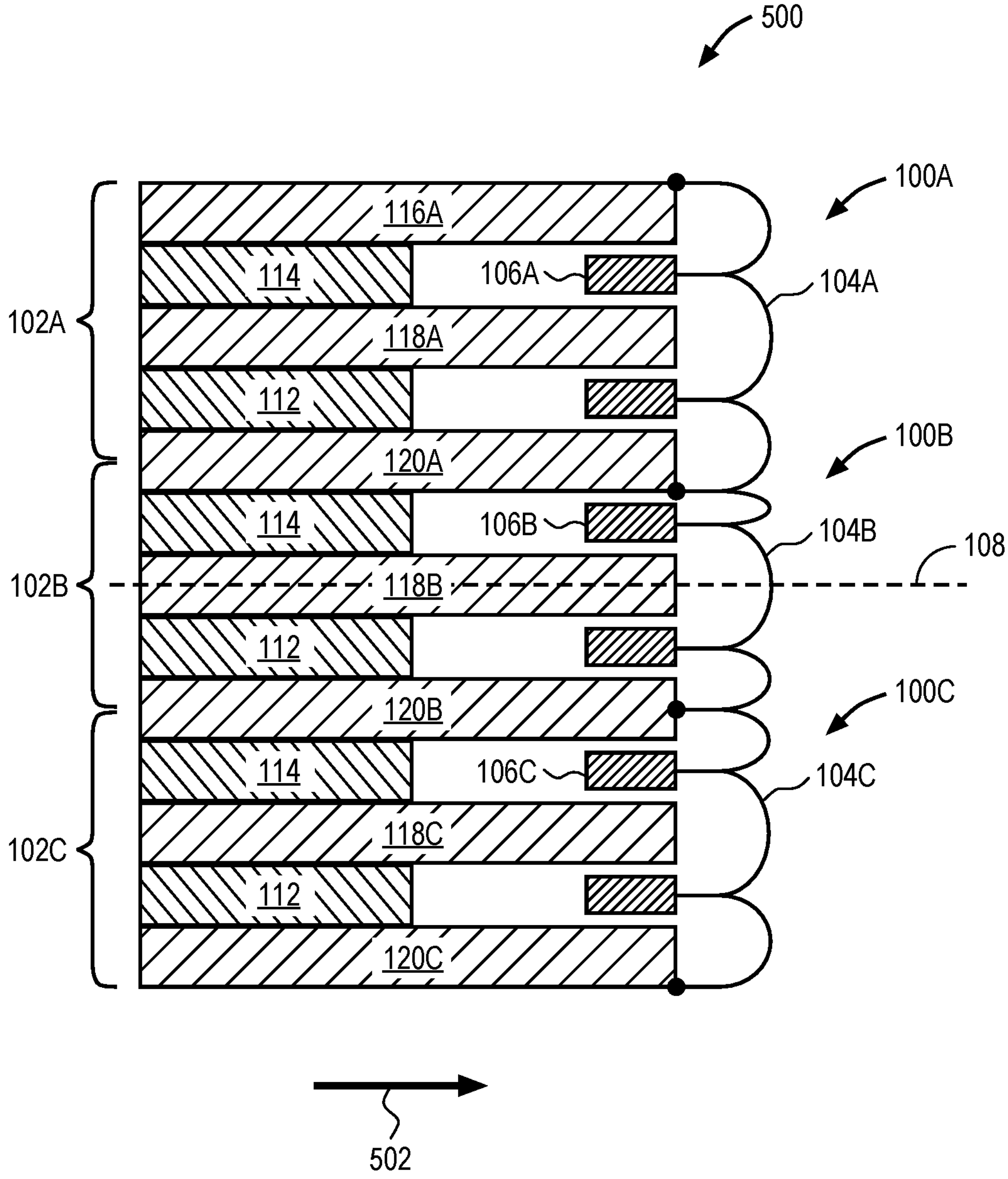
FIG. 5 illustrates a cross-section end view of another aspect of a transducer assembly.

FIG. 5 illustrates a cross-section end view of another aspect of a transducer assembly. Transducer assembly 500 may include any number of the previously discussed transducers in a stacked arrangement to create a larger radiating surface. Representatively, transducer assembly 500 may include a stacked arrangement of two or more of transducers 100. Representatively, transducer assembly 500 may include transducers 100A, 100B and 100C stacked together. Although not shown, each of the components of the previously discussed transducer 100 may be included in transducers 100A-100C, with the exception that adjacent transducers may share a support plate. Representatively, transducer 100A may include magnet assembly 102A, piston 104A and voice coil 106A as previously discussed in reference to FIG. 1-FIG. 2. Magnet assembly 102A may include two magnet plates 112, 114 arranged on opposite sides of a middle support plate 118A and between outer support plates 116A, 120A. The support plates 116A, 118A, 120A guide the magnetic flux lines through voice coil 106A, which is suspended within the magnetic gap formed between the plates by piston 104A, as previously discussed. Transducer 100B is positioned adjacent transducer 100A and includes magnet assembly 102B, piston 104B and voice coil 106B. Magnet assembly 102B includes two magnet plates 112, 114. Magnet plates 112, 114 are positioned on opposite sides of a middle support plate 118B, and arranged between the outer support plate 120A of magnet assembly 102A, and outer support plate 120B of assembly 102B. In this aspect, magnet assembly 102B shares an outer support plate 120A with magnet assembly 102A. The piston 104B is attached to plates 120A and 120B, and voice coil 106B is attached to the piston 104B so that it is suspended in the magnetic gap formed between the plates. Transducer 100C is positioned adjacent transducer 100B and includes magnet assembly 102C, piston 104C and voice coil 106C. Magnet assembly 102C includes two magnet plates 112, 114. Magnet plates 112, 114 are positioned on opposite sides of middle support plate 118C, and arranged between the outer support plate 120B of magnet assembly 120B and outer support plate 120C of assembly 102C. The piston 104C is attached to plates 120B and 120C, and voice coil 106C is attached to the piston 104C so that it is suspended in the magnetic gap formed by magnet assembly 102C. Each of the plates 112, 114, 116A, 118A-118C and 120A-120C may be arranged along the axis 108 (e.g., having a length or width dimension running parallel to axis 108) as previously discussed. The magnet assemblies 102A-102C may, for example, be mounted to an enclosure frame such that the plates are relatively stationary (particularly in a direction parallel to axis 108). The piston 104A-104C and voice coil 106A-106C move (e.g., vibrate) in a direction parallel to axis 108 upon application of a current. Stacking the transducer assemblies together in this manner therefore creates a larger radiating surface (e.g., pistons 104A-104C). In some aspects, the larger radiating surface (e.g., pistons 104A-104C) may be used for enhanced sound output (e.g., in the direction of arrow 502). Moreover, in some cases, each piston 104A-104C may be excited independently for improved beam-forming applications.

Figure 6:
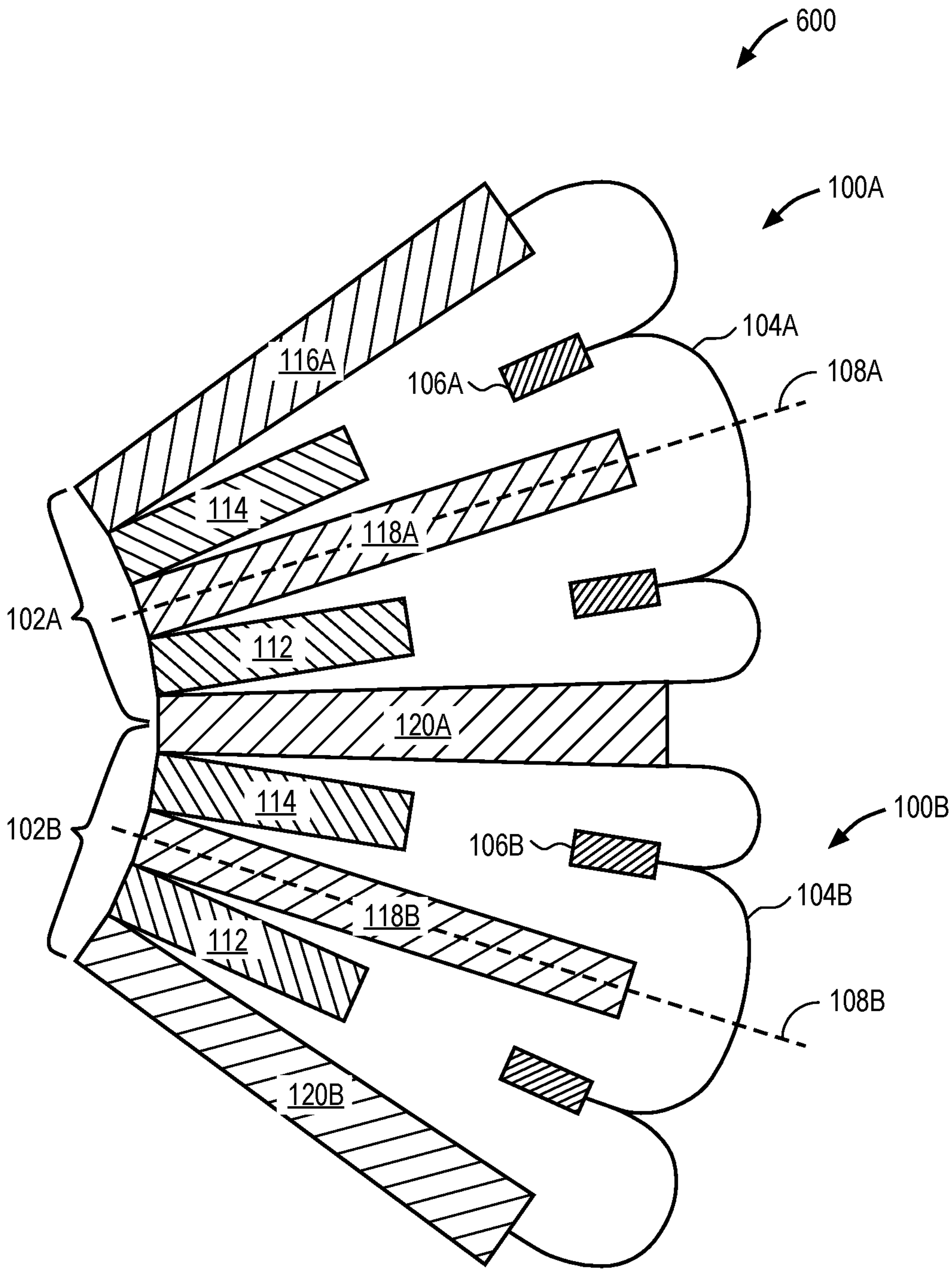
FIG. 6 illustrates a cross-section end view of another aspect of a transducer assembly.

FIG. 6 illustrates a cross-section end view of another aspect of a transducer assembly. Transducer assembly 600 may be similar to transducer assembly 500 in that it includes any number of the previously discussed transducers in a stacked arrangement. The transducers of assembly 600, however, are arranged at angles to one another so that the overall radiating surface is curved. Representatively, transducer assembly 600 may include a stacked arrangement of two or more of transducers 100. Representatively, transducer assembly 600 may include transducers 100A and 100B stacked together. Transducers 100A-100B may share a support plate. Representatively, transducer 100A may include magnet assembly 102A, piston 104A and voice coil 106A as previously discussed in reference to FIG. 5. Magnet assembly 102A may include two magnet plates 112, 114 arranged on opposite sides of a middle support plate 118A and between outer support plates 116A, 120A. The support plates 116A, 118A, 120A guide the magnetic flux lines through voice coil 106A, which is positioned within the magnetic gap formed between the plates, as previously discussed. Transducer 100B is positioned adjacent transducer 100A and includes magnet assembly 102B, piston 104B and voice coil 106B. Magnet assembly 102B includes two magnet plates 112, 114. Magnet plates 112, 114 are positioned on opposite sides of a middle support plate 118B, and arranged between the outer support plate 120A of magnet assembly 102A, and outer support plate 120B of assembly 102B. In this aspect, magnet assembly 102B shares an outer support plate 120A with magnet assembly 102A.

As can be seen in FIG. 6, transducer 100A may be arranged along one axis 108A and transducer 100B may be arranged along another axis 108B that is at an angle to axis 108A. This arrangement, in turn, results in piston 104A and piston 104B facing different directions and creates an enlarged radiating surface that is generally curved, or otherwise includes surfaces facing different directions. Depending on the number of transducers that are stacked, the radiating surface can cover a full 360 degrees. For example, magnet assembly 102A may be arranged so the center support plate 118A runs parallel to axis 108A. Each of the remaining plates 112, 114, 116A, 120A making up magnet assembly 102A may be arranged at angles to axis 108A, and each other. The adjacent magnet assembly 102B may be arranged so the center support plate 118B runs parallel to axis 108B. Each of the remaining plates 112, 114, 116B, 120B making up magnet assembly 102B may be arranged at angles to axis 108B, and each other. In other words, all of plates 112, 114, 116A-116B, 118A-118B and 120A-120B are at angles to one another. Piston 104A of magnet assembly 102A is attached to plates 116A, 120A so its axis of vibration is parallel to axis 108A, while piston 104B of magnet assembly 102B is attached to plates 120A, 120B so its axis of vibration is parallel to axis 108B. In this aspect, pistons 104A, 104B are considered facing different directions and/or have axes of vibration at angles to one another, and a sound output will, in turn, be in different directions (e.g., direction parallel to axes 108A, 108B). Increasing the numbers of transducers in the stack up will further increase the curved surface to a full 360 degree range for sound output in any number of directions within that range.

Figure 7:
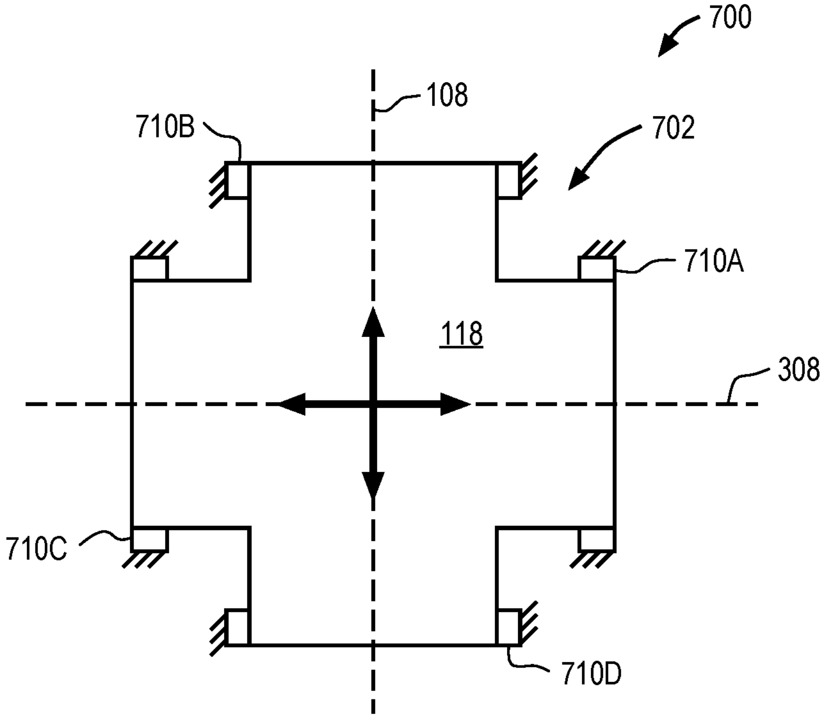
FIG. 7 illustrates a cross-sectional top view of another aspect of a transducer assembly.

FIG. 7 illustrates a cross-sectional top view of another aspect of a transducer assembly. Transducer assembly 700 may have the primary function of a shaker that is operable to move along multiple axes in different directions. Representatively, transducer assembly 700 may include a magnet assembly 702 which is formed by a stack-up of two magnets (e.g., magnets 112, 114) and three support plates (e.g., support plates 116, 118, 120) as previously discussed, although only middle support plate 118 is shown in FIG. 7. The remaining plates are removed for ease of illustration. Shaker coils 710A, 710B, 710C and 710D may be positioned around each end of the middle support plate 118 within magnetic gaps formed between the various magnets and support plates, similar to the arrangement shown in FIG. 3. In addition, although not shown, similar to magnet assembly 102 described in FIG. 3, magnet assembly 702 may be attached to a relatively stationary frame (e.g., frame 402) by one or more compliant members (e.g., members 404, 406) that allow assembly to move relative to the frame. The compliant members may, for example, be leaf springs or another compliant structure that will allow magnet assembly 702 to move relative to the frame. The shaker coils 710A-710D are arranged in pairs along each of axes 108, 308. For example, shaker coils 710B, 710D are arranged along axis 108 and shaker coils 710A, 710C are arranged along axis 308. In addition, shaker coils 710A-710D may be fixed to an actuating surface or device to be actuated or moved. In this aspect, upon application of a current that excites the magnet assembly 702 and shaker coils 710A-710D, shaker coils 710A-710D cause the magnet assembly 702 to be displaced in the desired axes (e.g., axes 108, 308). This, in turn, causes a movement (e.g., vibration) of the associated actuating surface along one or both of axes 108, 308 to achieve a multidirectional shaker function.

Figure 8:
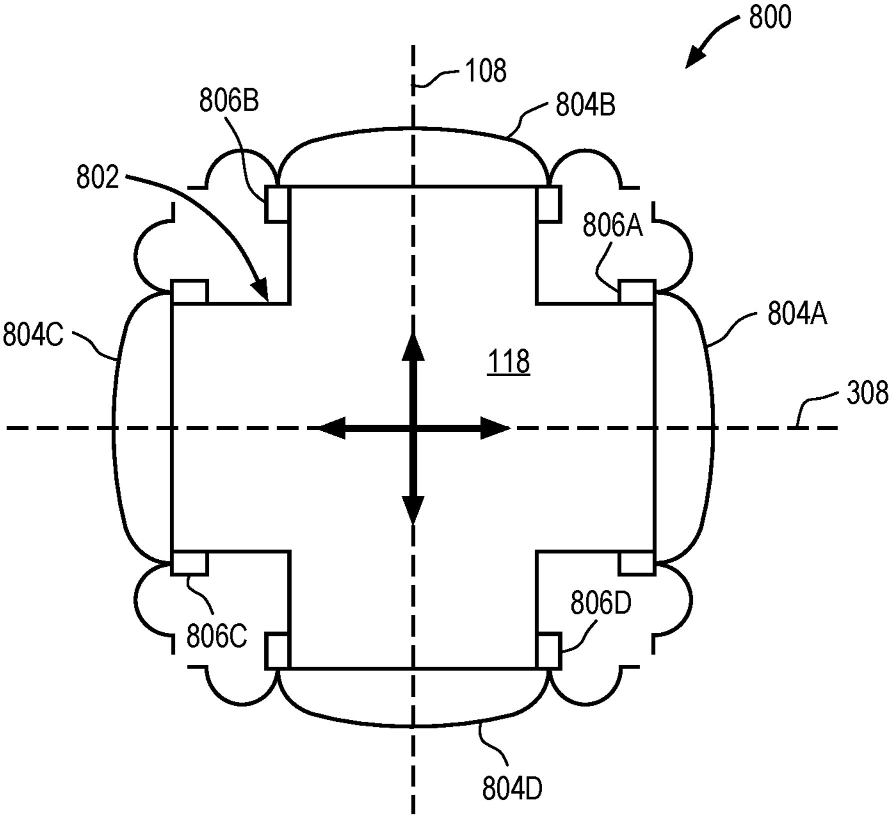
FIG. 8 illustrates a cross-sectional top view of another aspect of a transducer assembly.

FIG. 8 illustrates a cross-sectional top view of another aspect of a transducer assembly. Transducer assembly 800 may have a similar arrangement as transducer 700, except that it provides a loudspeaker function instead of a shaker function. Representatively, transducer assembly 800 may include a magnet assembly 802 which is formed by a stack-up of two magnets (e.g., magnets 112, 114) and three support plates (e.g., support plates 116, 118, 120) as previously discussed, although only middle support plate 118 is shown in FIG. 8. Each of pistons 804A, 804B, 804C and 804D may have a voice coil 806A, 806B, 806C and 806D attached to it, and may be positioned at each end of the middle support plate 118. For example, pistons 804A-804D may each be positioned over the end of the middle support plate and separately attached to a stationary structure (e.g., surrounding frame) by a suspension member (not shown). Voice coils 806A-806D may be suspended within magnetic gaps formed between the various magnets and support plates, by the pistons 804A-804D. In addition, although not shown, similar to magnet assembly 102 described in FIG. 2, magnet assembly 802 may be fixedly attached to a relatively stationary frame so that it does not move relative to the frame. The pistons 804A-804D and voice coils 806A-806D are arranged in pairs along each of axes 108, 308. For example, pistons 804B, 804D and voice coils 806B, 806D are arranged along axis 108 and pistons 804A, 804C and voice coils 806A, 806C are arranged along axis 308. Axis 108 may be perpendicular to axis 308. Pistons 804B, 804D and voice coils 806B, 806D arranged along axis 108 may therefore be described as facing a different direction than the pistons 804A, 804C and voice coils 806A, 806C arranged along axis 308. Upon application of a current that excites the magnet assembly 802 and voice coils 806A-806D, voice coils 806A-806D cause their respective pistons 804A-804D to be displaced in directions parallel to the desired axes (e.g., axes 108, 308). This, in turn, causes sound output in different directions parallel to one or both of axes 108, 308 to achieve a multidirectional or multiaxial loudspeaker function.

Figure 9:
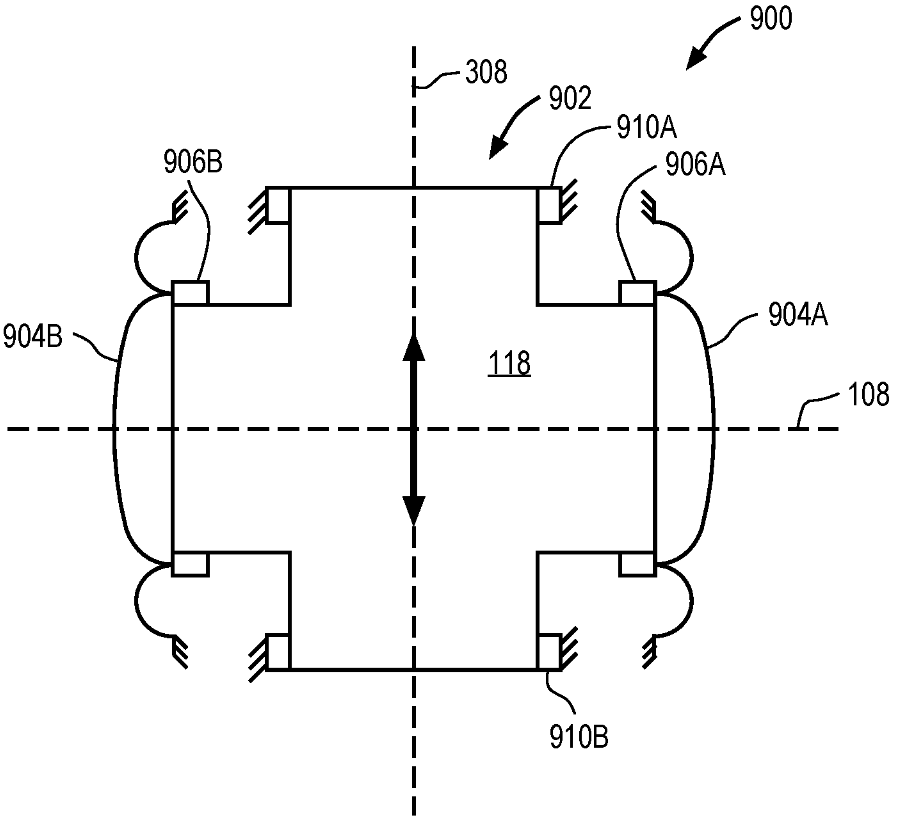
FIG. 9 illustrates a cross-sectional top view of another aspect of a transducer assembly.
Figure 10:
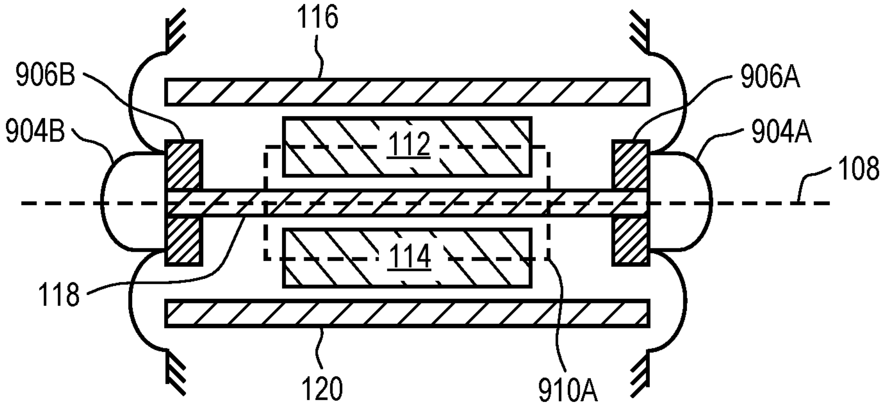
FIG. 10 illustrates a cross-sectional side view of the transducer assembly of FIG. 9.

FIG. 9 illustrates a cross-sectional top view of another aspect of a transducer assembly. FIG. 10 illustrates a cross-sectional side view of the transducer assembly of FIG. 9. Transducer assembly 900 may have a similar arrangement to aspects of transducer 700 and transducer 800 so that it provides both a loudspeaker function and a shaker function. Representatively, transducer assembly 900 may have four coils, two of which may be voice coils connected to pistons along one axis to achieve the loudspeaker function, and the other two may be shaker coils positioned along another axis for the shaker function. Representatively, transducer assembly 900 may include a magnet assembly 902 which is formed by a stack-up of two magnets (e.g., magnets 112, 114) and three support plates (e.g., support plates 116, 118, 120) as previously discussed. Only the middle support plate 118 can be seen in FIG. 9, and the remaining plates 112, 114, 116 and 120 can be seen in FIG. 10. A pair of pistons 904A, 904B with voice coils 906A, 906B coupled thereto may be positioned at opposite ends of the middle support plate (e.g, support plate 118) along axis 108. Voice coils 906A, 906B may be suspended within magnetic gaps formed between the various magnets and support plates, by the pistons 804A, 804B, as previously discussed. In addition, although not shown, pistons 904A, 904B may be fixedly attached to a relatively stationary frame by a surround or other suspension member. The pistons 904A, 904B and voice coils 906A, 906B are arranged along axis 108 such that their axis of vibration is parallel to axis 108. In particular, upon application of a current that excites the magnet assembly 902 and voice coils 906A, 906B, pistons 904A, 904B may be displaced in a direction parallel to axis 108. The pistons 904A, 904B may be displaced simultaneously, or independently, as desired. It is further contemplated that although a pair of pistons/voice coils is shown, additional pistons/voice coils along different axes may also be included (e.g, axis 308). The vibration of the pistons 904A, 904B produces an audio or sound output along at least axis 108 for the loudspeaker function.

Shaker coils 910A, 910B may be arranged along opposite ends or sides of the middle support plate of magnet assembly 902, which are different from the ends or sides the voice coils 906A, 906B are arranged around. For example, shaker coils 910A, 910B may be arranged around sides that are bisected by the axis 308, which is perpendicular to axis 108. The magnet assembly 902 may be attached to the fixed structure (e.g., a frame) by a compliant member (e.g., leaf spring) so that the magnet assembly 902 can move relative to the fixed structure. Upon application of a current that excites the magnet assembly 902 and shaker coils 910A, 910B, shaker coils 910A, 910B cause magnet assembly 902 to be displaced in a direction parallel to axis 308 (e.g., perpendicular to axis 108), as illustrated by the arrow. This in turn, results in a movement of an actuating surface attached to the magnet assembly 902 for the shaker function. Transducer 900 may be operable to switch between the shaker function and loudspeaker function as desired.

Figure 11:
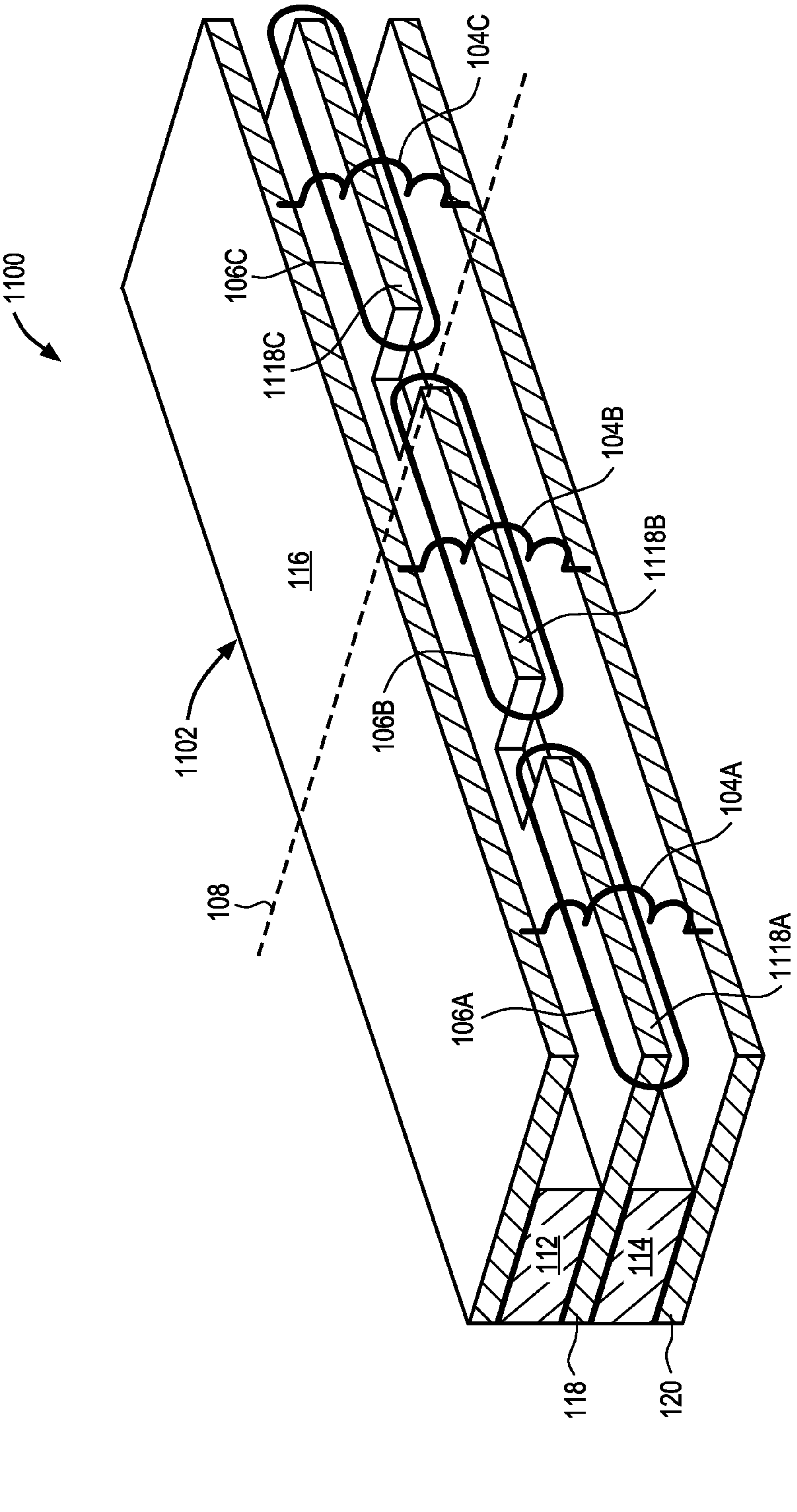
FIG. 11 illustrates a side perspective view of another aspect of a transducer assembly.

FIG. 11 illustrates a side perspective view of another aspect of a transducer assembly. Transducer assembly 1100 may have a similar arrangement to aspects of transducer 500 except that instead of vertically or radially arranging the pistons/voice coils relative to one another (as shown in FIGS. 5-6), they are horizontally arranged along an end of the same middle plate. Representatively, transducer assembly 1100 may include a magnet assembly 1102 which is formed by a stack-up of two magnets (e.g., magnets 112, 114) and three support plates (e.g., support plates 116, 118, 120) as previously discussed. One end or side of the middle support plate 118 may include a number of horizontally arranged, side by side protrusions or receiving members 1118A, 1118B, 1118C. Pistons 104A, 104B, 104C with voice coils 106A, 106B, 106C coupled thereto may be positioned over the members 1118A, 1118B, 1118C, respectively. For example, opposite ends or sides of each of the pistons 104A-104C may be attached to the outer plates 116, 120 as shown. This, in turn, positions the voice coils 106A-106C around members 1118A-1118C, and within the magnetic gaps formed around each of members 1118A-1118C. Upon application of a current, the voice coils 106A-106C will vibrate in a direction parallel to axis 108. The voice coils 106A-106C can be excited independently or together. The vibration of the voice coils 106A-106C causes a vibration of the associated pistons 104A-104C. In some aspects, this line source or array of voice coils 106A-106C can be excited independently for beaming purposes.

Figure 12:
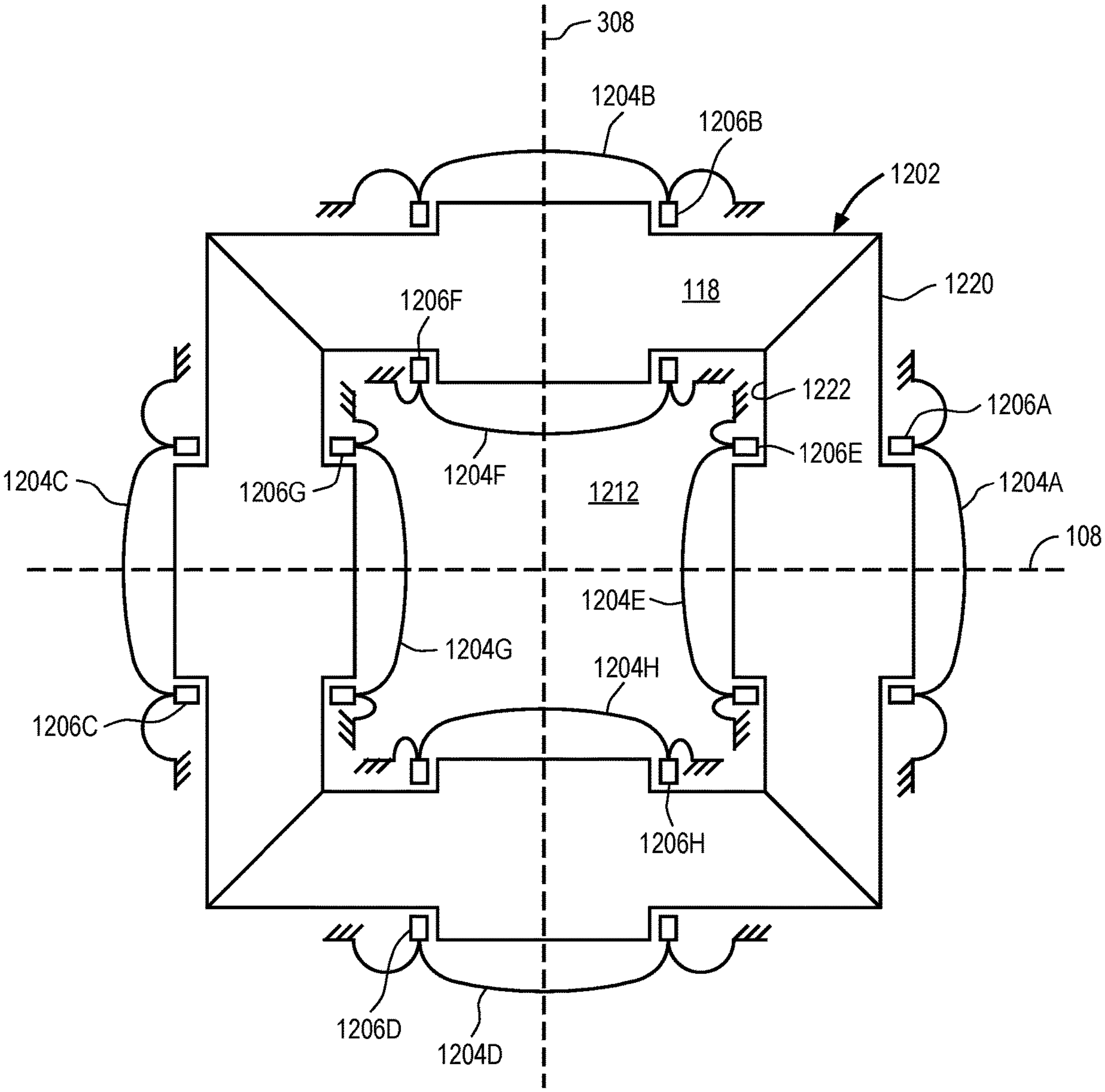
FIG. 12 illustrates a cross-sectional top view of another aspect of a transducer assembly.

FIG. 12 illustrates a top plan view of another aspect of a transducer assembly. Transducer assembly 1200 may have a similar arrangement as transducer 800, except that it includes a center opening to receive additional pistons/voice coils. Representatively, transducer assembly 1200 may include a magnet assembly 1202 which is formed by a stack-up of two magnets (e.g., magnets 112, 114) and three support plates (e.g., support plates 116, 118, 120) as previously discussed, although only middle support plate 118 is shown in FIG. 12. The magnet assembly 1202 may further include a center opening 1212 so that pistons and voice coils can be arranged around both the outer edges or sides 1220 and interior edges or sides 1222 of the middle support plate 118 as shown. For example, the magnet assembly 1200 may have a ring like configuration as shown. Pistons 1204A, 1204B, 1204C, 1204D having voice coils 1206A, 1206B, 1206C, 1206D attached thereto are arranged around the outer sides 1220 of support plate 118. Pistons 1204E, 1204F, 1204G, 1204H having voice coils 1206E, 1206F, 1206G, 1206H are arranged around the inner sides 1222 of support plate 118 (e.g., within opening 1212). In addition, pistons 1204A, 1204C, 1204E, 1204G and the associated voice coils 1206A, 1206C, 1206E, 1206G may be considered arranged along axis 108 such that they all move (e.g, vibrate) in a direction parallel to axis 108. Pistons 1204B, 1204D, 1204F, 1204H and the associated voice coils 1206B, 1206D, 1206F, 1206H may be considered arranged along axis 308 such that they all move (e.g., vibrate) in a direction parallel to axis 308. Axis 108 and axis 308 may be perpendicular to one another such that the pistons/voice coils arranged along the different axes 108, 308 face different directions, and vibrate in different directions. Similar to the previously discussed configurations, magnet assembly 1202 may be mounted to a fixed structure (e.g., frame) so that it is relatively stationary, and the pistons 1204A-1204H and voice coils 1206A-1206H are attached to the fixed structure by a compliant member (e.g., surround) such that they are free to move relative to the fixed structure. Upon application of a current, the voice coils 1206A-1206H move (e.g., vibrate) and cause the pistons 1204A-1204H to move (e.g., vibrate), for example, to produce a multidirectional or multiaxial sound output. For example, in some cases, pistons 1204A-1204D may be used to produce a high frequency sound output and pistons 1204E-1204H may be used to produce a low frequency sound output.

Figure 13:
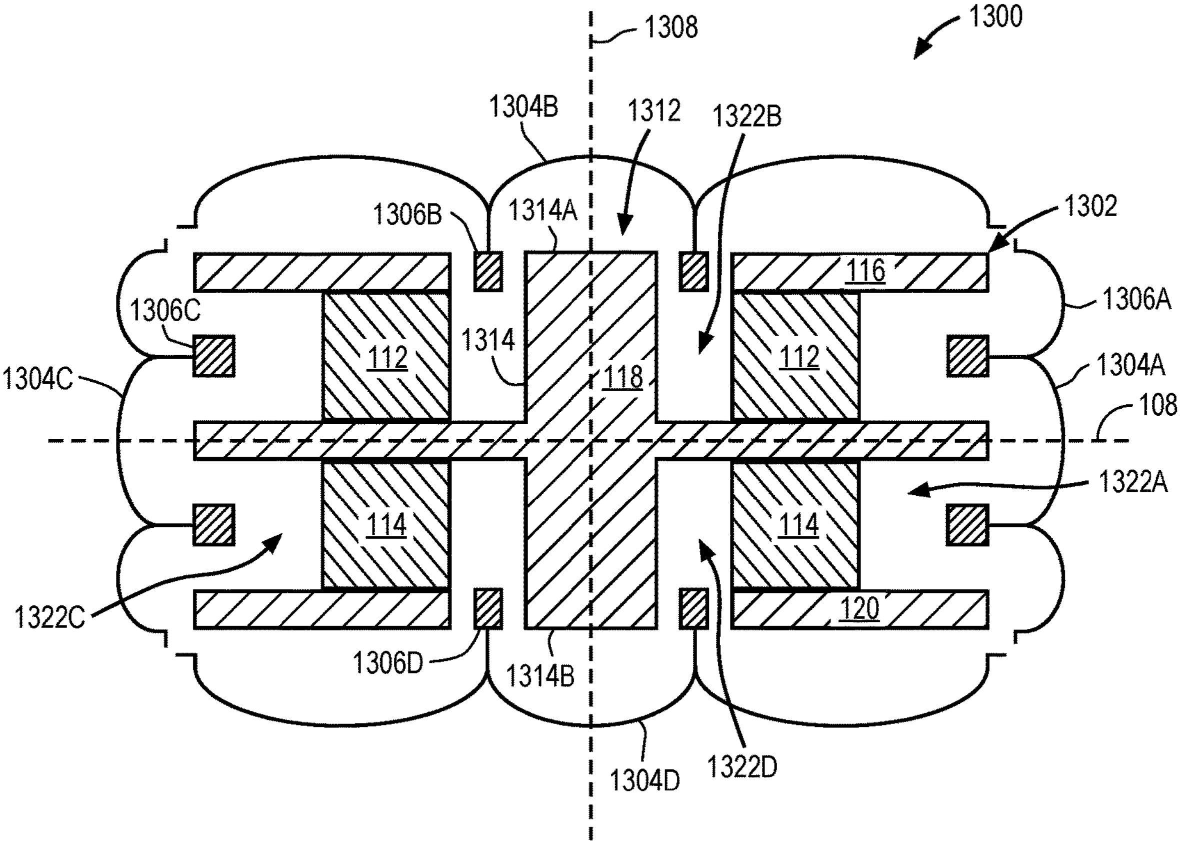
FIG. 13 illustrates a cross-sectional side view of another aspect of a transducer assembly.

FIG. 13 illustrates a cross-sectional side view of another aspect of a transducer assembly. Transducer assembly 1300 may have a similar arrangement as transducer 800, except that it includes a center opening to receive an extension portion of the middle plate that allows for an additional piston/voice coil assembly. Representatively, transducer assembly 1300 may include a magnet assembly 1302 which is formed by a stack-up of two magnets 112, 114 and three support plates 116, 118, 120, as previously discussed. The magnet assembly 1302 may further include a center opening 1312. The center opening 1312 extends through each of the magnets 112, 114 and the outer support plates 116, 120. The middle support plate 118 includes an extension member 1314 that extends perpendicular to a top surface and a bottom surface of support plate 118. For example, support plate 118 may have a substantially cross-shaped configuration as shown. The extension member 1314 includes a top end 1314A that extends through the opening in magnet 112 and outer plate 116, and a bottom end 1314B that extends through the opening in magnet 114 and outer plate 120. As a result of this arrangement, at least four different gaps or channels 1322A, 1322B, 1322C, 1322D for receiving a voice coil are formed between the middle support plate 118 and the outer plates 116, 120.

At least four different pistons 1304A, 1304B, 1304C, 1304D and voice coils 1306A, 1306B, 1306C, 1306D can be arranged around magnet assembly 1302, and along different axes. For example, pistons 1304A, 1304C having voice coils 1306A, 1306C attached thereto are arranged along axis 108, and pistons 1304B, 1304D having voice coils 1306B, 1306D attached thereto are arranged along axis 1308. It should be noted that axis 1308 may be different from the previously discussed axes (e.g., axes 108, 308) in that it is an axis through the opening 1302 in the magnet assembly 1302, and therefore not within a same plane as the plates forming magnet assembly 1302. Axis 108 is perpendicular to axis 1308, and runs parallel to the planar surfaces of the various plates 112, 114, 116, 120. Pistons 1304A, 1304C and the associated voice coils 1306A, 1306C are arranged along axis 108 such that they all move (e.g, vibrate) in a direction parallel to axis 108. Pistons 1304B, 1304D and the associated voice coils 1306B, 1306D are arranged along axis 1308 such that they all move (e.g., vibrate) in a direction parallel to axis 1308. Similar to the previously discussed configurations, magnet assembly 1302 may be mounted to a fixed structure (e.g., frame) so that it is relatively stationary, and the pistons 1304A-1304C and voice coils 1306A-1306C are attached to the fixed structure by a compliant member (e.g., surround) such that they are free to move relative to the fixed structure. Upon application of a current, the voice coils 1306A-1306C move (e.g., vibrate) and cause the pistons 1304A-1304C to move (e.g., vibrate), for example, to produce a multidirectional or multiaxial sound output. This, in turn, causes sound output in different directions parallel to one or both of axes 108, 1308 to achieve a multidirectional or multiaxial loudspeaker function.

Figure 14:
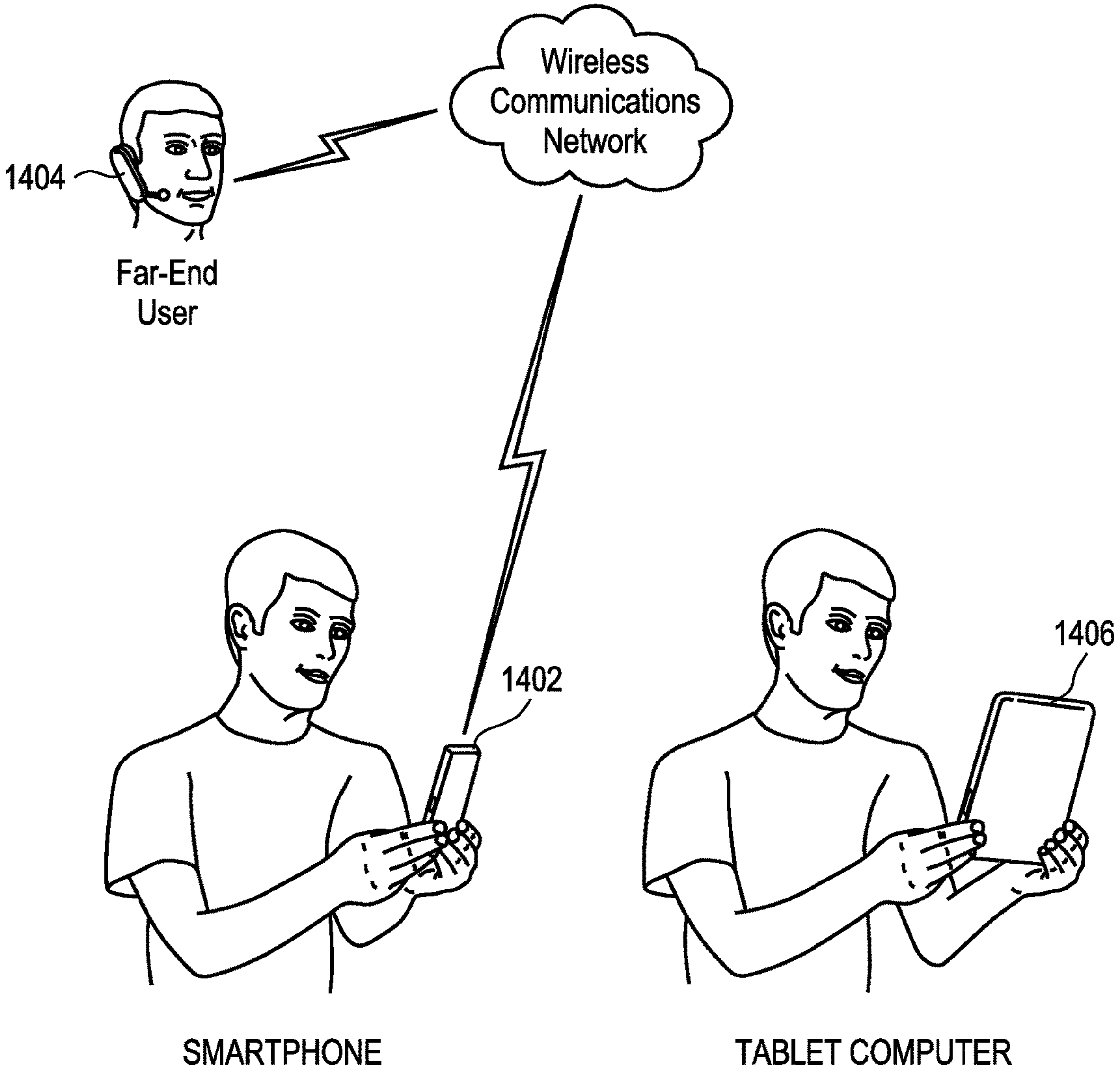
FIG. 14 illustrates a simplified schematic view of an electronic device in which a transducer assembly may be implemented.

FIG. 14 illustrates a simplified schematic perspective view of an exemplary electronic device in which a transducer assembly as described herein, may be implemented. As illustrated in FIG. 14, the transducer assembly may be integrated within a consumer electronic device 1402 such as a smart phone with which a user can conduct a call with a far-end user of a communications device 1404 over a wireless communications network; in another example, the transducer assembly may be integrated within the housing of a tablet computer 1406. These are just two examples of where the transducer assembly described herein may be used; it is contemplated, however, that the transducer assembly may be used with any type of electronic device, for example, a home audio system, any consumer electronics device with audio capability, or an audio system in a vehicle (e.g., an automobile infotainment system.).

Figure 15:
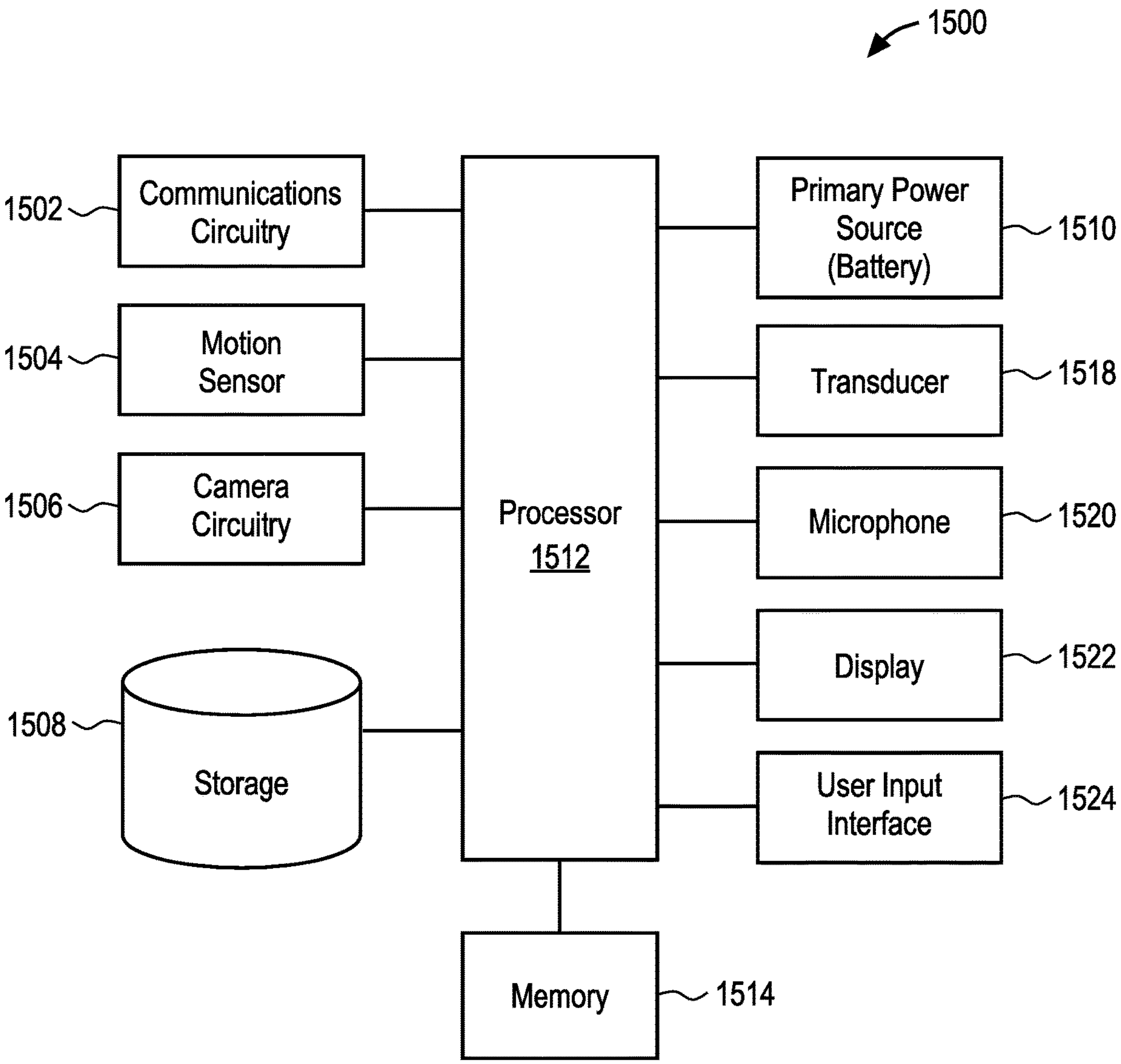
FIG. 15 illustrates a block diagram of some of the constituent components of an electronic device in which a transducer assembly may be implemented.

FIG. 15 illustrates a block diagram of some of the constituent components of an electronic device in which the transducer assembly disclosed herein may be implemented. Device 1500 may be any one of several different types of consumer electronic devices, for example, any of those discussed in reference to FIG. 14.

In this aspect, electronic device 1500 includes a processor 1512 that interacts with camera circuitry 1506, motion sensor 1504, storage 1508, memory 1514, display 1522, and user input interface 1524. Main processor 1512 may also interact with communications circuitry 1502, primary power source 1510, transducer 1518 and microphone 1520. Transducer 1518 may be a speaker and/or the transducer assembly described herein. The various components of the electronic device 1500 may be digitally interconnected and used or managed by a software stack being executed by the processor 1512. Many of the components shown or described here may be implemented as one or more dedicated hardware units and/or a programmed processor (software being executed by a processor, e.g., the processor 1512).

The processor 1512 controls the overall operation of the device 1500 by performing some or all of the operations of one or more applications or operating system programs implemented on the device 1500, by executing instructions for it (software code and data) that may be found in the storage 1508. The processor 1512 may, for example, drive the display 1522 and receive user inputs through the user input interface 1524 (which may be integrated with the display 1522 as part of a single, touch sensitive display panel). In addition, processor 1512 may send a current or signal (e.g., audio signal) to transducer 1518 to facilitate operation of transducer 1518. Representatively, the processor 1512 may send a current or signal to one or more components of the transducer assembly (e.g., voice coil 106, shaker coils 302, 304, etc) to drive the components independently or together. For example, the coils 106, 302, 304 could be driven independently by different channels on the amplifier, or together by the same channel, depending on the application needs.

Storage 1508 provides a relatively large amount of "permanent" data storage, using nonvolatile solid state memory (e.g., flash storage) and/or a kinetic nonvolatile storage device (e.g., rotating magnetic disk drive). Storage 1508 may include both local storage and storage space on a remote server. Storage 1508 may store data as well as software components that control and manage, at a higher level, the different functions of the device 1500.

In addition to storage 1508, there may be memory 1514, also referred to as main memory or program memory, which provides relatively fast access to stored code and data that is being executed by the processor 1512. Memory 1514 may include solid state random access memory (RAM), e.g., static RAM or dynamic RAM. There may be one or more processors, e.g., processor 1512, that run or execute various software programs, modules, or sets of instructions (e.g., applications) that, while stored permanently in the storage 1508, have been transferred to the memory 1514 for execution, to perform the various functions described above.

The device 1500 may include communications circuitry 1502. Communications circuitry 1502 may include components used for wired or wireless communications, such as two-way conversations and data transfers. For example, communications circuitry 1502 may include RF communications circuitry that is coupled to an antenna, so that the user of the device 1500 can place or receive a call through a wireless communications network. The RF communications circuitry may include a RF transceiver and a cellular baseband processor to enable the call through a cellular network. For example, communications circuitry 1502 may include Wi-Fi communications circuitry so that the user of the device 1500 may place or initiate a call using voice over Internet Protocol (VOIP) connection, transfer data through a wireless local area network.

The device may include a transducer 1518. Transducer 1518 may be a speaker and/or a transducer assembly such as that described in reference to FIGS. 1-13. Transducer 1518 may be an electric-to-acoustic transducer or sensor that converts an electrical signal input (e.g., an aocustic input)

into a sound or vibration output. The circuitry of the speaker may be electrically connected to processor 1512 and power source 1510 to facilitate the speaker operations as previously discussed (e.g, diaphragm displacement, etc).

The device 1500 may further include a motion sensor 1504, also referred to as an inertial sensor, that may be used to detect movement of the device 1500, camera circuitry 1506 that implements the digital camera functionality of the device 1500, and primary power source 1510, such as a built in battery, as a primary power supply.

While certain aspects have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. An electronic device comprising:

an enclosure having an enclosure wall defining an enclosed space;

a magnet motor assembly coupled to the enclosure wall;

a first transducer component coupled to the magnet motor assembly, the first transducer component operable to move in a direction parallel to a first axis to produce a first transducer function; and a second transducer component coupled to the magnet motor assembly, the second transducer component comprising a shaker coil operable to vibrate the magnet motor assembly in a direction parallel to a second axis to produce a second transducer function that vibrates the enclosure wall, and wherein the second axis is perpendicular to the first axis, and the first axis and the second axis are within a same plane.

2. The electronic device of claim 1 wherein the first transducer function is a sound output.

3. The electronic device of claim 1 wherein the first transducer component comprises a voice coil coupled to a piston, and actuation of the voice coil vibrates the piston in the direction parallel to the first axis.

4. The electronic device of claim 3 wherein the voice coil is positioned within a voice coil gap formed at a length side of the magnet motor assembly.

5. The electronic device of claim 1 wherein the second transducer function is a haptic output.

6. The electronic device of claim 1 wherein the shaker coil is positioned within a shaker coil gap formed at a width side of the magnet motor assembly.

7. The electronic device of claim 1 wherein the magnet motor assembly is configured to direct a magnetic field into a first region of magnetic field density and a second region of magnetic field density, and wherein the first region of magnetic field density actuates the first transducer component and the second region of magnetic field density actuates the second transducer component.

8. A dual function transducer assembly comprising:

a magnet motor assembly coupled to an enclosure wall;

a first transducer component coupled to the magnet motor assembly, the first transducer component operable to move in a direction parallel to a first axis to produce a first transducer function; and a second transducer component coupled to the magnet motor assembly, the second transducer component comprising a shaker coil operable to vibrate the magnet motor assembly in a direction parallel to a second axis to produce a second transducer function that vibrates the enclosure wall, and wherein the second axis is perpendicular to the first axis, and the first axis and the second axis are within a same plane.

9. The dual function transducer assembly of claim 8 wherein the first transducer function is a sound output.

10. The dual function transducer assembly of claim 8 wherein the first transducer component comprises a voice coil coupled to a piston, and actuation of the voice coil vibrates the piston in the direction parallel to the first axis.

11. The dual function transducer assembly of claim 10 wherein the voice coil is positioned within a voice coil gap formed at a length side of the magnet motor assembly.

12. The dual function transducer assembly of claim 8 wherein the second transducer function is a haptic output.

13. The dual function transducer assembly of claim 8 wherein the shaker coil is positioned within a shaker coil gap formed at a width side of the magnet motor assembly.

14. The dual function transducer assembly of claim 8 wherein the magnet motor assembly is configured to direct a magnetic field into a first region of magnetic field density and a second region of magnetic field density, and wherein the first region of magnetic field density actuates the first transducer component and the second region of magnetic field density actuates the second transducer component.

* * * * *